(12) United States Patent
Noh et al.

(10) Patent No.: US 8,509,681 B2
(45) Date of Patent: Aug. 13, 2013

(54) RELAY NETWORK AND ENTITY FOR CONTINUOUS TRANSMISSION BASED ON SUPERPOSITION CODING

(75) Inventors: Taegyun Noh, Daejeon (KR); Seong Keun Oh, Gyeonggi-do (KR); Min Lee, Gyeonggi-do (KR); Byung Jang Jeong, Daejeon (KR); Hyun Kyu Chung, Daejeon (KR)

(73) Assignees: Electronics and Telecommunication Research Institute, Daejeon (KR); Ajou University Industry — Academic Cooperation Foundation, Gyeonggi-do (KR)

( * ) Notice: Subject to any disclaimer, the term of this patent is extended or adjusted under 35 U.S.C. 154(b) by 548 days.

(21) Appl. No.: 12/747,655

(22) PCT Filed: Dec. 11, 2008

(86) PCT No.: PCT/KR2008/007327
§ 371 (c)(1),
(2), (4) Date: Jun. 11, 2010

(87) PCT Pub. No.: WO2009/075527
PCT Pub. Date: Jun. 18, 2009

(65) Prior Publication Data
US 2010/0279600 A1    Nov. 4, 2010

(30) Foreign Application Priority Data
Dec. 12, 2007  (KR) .................. 10-2007-0129170

(51) Int. Cl.
*H04B 7/14* (2006.01)
*H04W 72/04* (2009.01)

(52) U.S. Cl.
USPC .......... 455/7; 455/509; 455/452.1; 455/67.11

(58) Field of Classification Search
USPC ............... 455/7, 11.1, 509, 452.1, 452.2, 15, 455/67.11, 24, 41.1, 41.2, 450; 370/230, 370/342, 335, 315, 328, 329
See application file for complete search history.

(56) References Cited

U.S. PATENT DOCUMENTS

| | | | |
|---|---|---|---|
| 2007/0223374 A1* | 9/2007 | Popovski et al. | 370/230 |
| 2008/0273512 A1* | 11/2008 | Attar et al. | 370/342 |
| 2009/0296662 A1* | 12/2009 | Laroia et al. | 370/335 |

FOREIGN PATENT DOCUMENTS

| | | |
|---|---|---|
| JP | 2000-125345 | 4/2000 |
| KR | 1020040093400 | 11/2004 |

(Continued)

OTHER PUBLICATIONS

Korean Notice of Allowance for Application No. 1020070129170, dated Oct. 29, 2010.

(Continued)

*Primary Examiner* — John J Lee
(74) *Attorney, Agent, or Firm* — Nelson Mullins Riley & Scarborough LLP

(57) ABSTRACT

Disclosed is a method of using relay that may continuously transmit data without time division based on superposition coding in a communication system. When transmission of a relay-supported user signal via a base station-relay link is performed, the method of using relay based on the superposition coding reuses a resource allocated to a direct-transmission user based on the superposition coding to perform the transmission. According to example embodiments, a separate resource for the base station-relay link may not be needed, and continuous relay transmission is possible without time division, thereby substantially increasing frequency efficiency and reducing a transmission delay caused by the use of the relay.

14 Claims, 9 Drawing Sheets

(56) References Cited

FOREIGN PATENT DOCUMENTS

| KR | 1020060002771 | 1/2006 |
|---|---|---|
| KR | 1020060058352 | 5/2006 |
| KR | 1020070055313 | 5/2007 |
| WO | 2004/075470 A2 | 9/2004 |
| WO | 2005/064872 A1 | 7/2005 |

OTHER PUBLICATIONS

Popovski, Petar et al., "Spectrally-Efficient Wireless Relaying based on Superposition Coding," IEEE 65th Vehicular Technology Conference, pp. 2936-2940 (2007).

* cited by examiner

RELAY NETWORK AND ENTITY FOR CONTINUOUS TRANSMISSION BASED ON SUPERPOSITION CODING

RELATED APPLICATIONS

This application is a 35 U.S.C. §371 national stage filing of PCT Application No. PCT/KR2008/007327 filed on Dec. 11, 2008, which claims priority to, and the benefit of, Korean Patent Application No. 10-2007-0129170 filed on Dec. 12, 2007. The contents of the aforementioned applications are hereby incorporated by reference.

TECHNICAL FIELD

The present invention relates to a wireless communication network system that wirelessly transmits data, and more particularly, to a relay support network system that transmits data to a terminal using a relay.

This work was supported by the IT R&D program of MIC/IITA. [2006-S-001-02, title: adaptable wireless access and transmission technique applied to 4G mobile communication system]

BACKGROUND ART

As demand for a mobile communication service rapidly increases, a next generation mobile communication system requires efficient use of limited frequency resources and high data transmission rate.

A relay has an advantage that the relay increases coverage through removing a shadow area with inexpensive cost compared with a base station, and improves a data throughput, thereby drawing attention as one of the main technology for the next generation mobile communication system.

Generally, the relay is operated in a time division mode to eliminate interference that may occur between a base station-relay link and the relay-terminal link. Accordingly, periodic discontinuance of transmission may occur in a network system including the relay, and thus, transmission delay caused by the use of the relay may occur. Also, to eliminate interference that may occur between the base station-relay link and a direct-transmission link between the base station and a terminal, separate resources for respective links are allocated to each link and data is transmitted. Accordingly, an amount of the resource that the base station is allocated for direct-transmission users may decrease, thereby decreasing spectrum efficiency. Advantages that may be obtained from using the relay may be limited due to the above mentioned problems.

Wireless World Initiative New Radio (WINNER) which is a big European project for developing a next generation mobile communication system has been researching a relay as the core technology for the next generation mobile communication system that may cut cost and provide flexibility in deployment.

Through a result of the research to date, it is recognized that a cell coverage increases by 20% to 60% in a cellular system using the relay. Particularly, WINNER researches a cost efficiency of using of the relay, a resource management method for using the relay, and a relay deployment. From among those subjects, the resource management method for using the relay is enthusiastically researched. As an example WINNER intends to solve the problems caused by operation in the time division mode and separate resource allocation for base station-relay link transmission, using a wireless resource management method.

Recently, a relay transmission method based on superposition coding has been suggested. In a conventional method, a base station performs superposition of two different signals using time division and simultaneously transmits the superpositioned signals, and a relay that receives the superpositioned signals relay-transmits a signal which low power is allocated from among the superpositioned signals. In this instance, the base station allocates appropriate power to the two different signals according to a grade based on a signal to ratio (SNR) of the base station-relay link and SNR of the base station-terminal link, and performs superposition of two different signals to transmit. Subsequently, a terminal having a relatively insufficient channel may have difficulty in detecting signals from the received signals. In this instance, the terminal stores the received signals. However, a relay having a relatively good channel may detect all the two different signals. After detecting all the two different signals, the relay performs encoding of the signal to which low power is allocated from among the two signals considering the SNR of the relay-terminal link to transmit the encoded signal to the terminal. In this instance, the terminal may detect the signal received from the relay and eliminate the detected signal from the signals received from the base station, thereby detecting the other signal (the signal to which high power is allocated). Accordingly, since the terminal simultaneously receives two signals, frequency efficiency increases. However, conventional superposition coding may perform superposition of data transmitted over the same transmission link and transmit the superpositioned data in downlink transmission or uplink transmission. That is, the relay and the terminal may perform superposition data between the base station-relay link and the base station-terminal link to transmit the superposed data to the base station in uplink, in the same way as the base station performs superposition of data between the base station-relay link and the base station-terminal link to transmit the superposed data in downlink. That is, the relay may perform uplink transmission of data via the base station-relay link, and the terminal may perform uplink transmission of data via the base station-terminal link. In this instance, the uplink transmission of the relay and the terminal may be performed using the same resource. The downlink and/or uplink transmission of the superposition coding is disclosed in pages 31 to 33 of PCT/WO2004/075470 titled "Controlled Superposition coding in Multi-user Communication Systems". Also, in a communication network using the superposition coding transmission, a communication entity allocates power for each user terminal to satisfy requirements of each user terminal and performs superposition coding transmission of data.

Since a conventional relay transmission method using the superposition coding is operated in the time division mode, relay-terminal link transmission should be performed after transmission of the base station-relay link. Accordingly, the periodic discontinuance of the transmission is unavoidable, and thus transmission delay may occur.

In the present specification, a relay network system that enables continuous transmission without time division and each entity for the system are disclosed.

DISCLOSURE OF INVENTION

Technical Goals

An aspect of the present invention provides a relay network system that may transmit a relay-supported user signal by reusing a resource allocated to a direct-transmission user, when the relay-supported user signal is transmitted in a base station-relay link based on superposition coding method.

An aspect of the present invention also provides a relay network system that may not require a separate resource for transmitting a relay-supported user signal via a base station-relay link, and may enable continuous data transmission without time division between the base station-relay link and a relay-terminal link.

An aspect of the present invention also provides a method for improving frequency efficiency during data transmission and reducing transmission delay, which was a problem of a conventional relay.

An aspect of the present invention also provides a method of using a relay that improves frequency efficiency based on superposition coding in the communication system and reduces transmission delay caused by the use of the relay, through continuous transmission.

Technical Solutions

According to an aspect of the present invention, there is provided a base station including a transmission data generating unit to generate transmission data by performing superposition of direct-transmission data to be transmitted to a first terminal with relay transmission data to be transmitted to a second terminal via a relay, and a transmitting unit to transmit the generated transmission data to the relay using a resource allocated to a direct-transmission link that directly communicates with the first terminal.

According to another aspect of the present invention, there is provided a relay including a receiving unit to receive superposition coded transmission data from a base station, a restoring unit to restore a direct-transmission data to be transmitted to a first terminal and relay transmission data to be transmitted to a second terminal, from the received transmission data, and a transmission unit to continuously transmit the restored relay transmission data to the second terminal.

According to still another aspect of the present invention, there is provided a relay including a receiving unit to receive, from a base station, first superposition coded transmission data that direct-transmission data to be transmitted to a first terminal and relay transmission data to be transmitted to a second terminal are first superposition coded, a restoring unit to restore the direct-transmission data and the relay transmission data from the received transmission data, a superposition coding unit to perform second superposition coding of the restored direct-transmission data and the restored relay transmission data to generate second transmission data, and a transmitting unit to transmit the generated second transmission data to the first terminal and the second terminal.

According to yet another aspect of the present invention, there is provided a relay system including a base station to perform superposition coding of direct-transmission data to be directly transmitted to a first terminal and relay transmission data to be transmitted to a second terminal via a relay to continuously transmit the superposition coded data to the first terminal and the relay, and a relay to restore the direct-transmission data and the relay transmission data from the received data, and relay to continuously transmit the restored relay transmission data to the second terminal.

Advantageous Effect

According to the present invention, a method of using a relay based on superposition coding may improve frequency efficiency of data transmission, and may enable continuous data transmission without time division between a base station-relay link and a relay-terminal link.

Also, according to the present invention, since the continuous data transmission is possible, the method may reduce transmission delay caused by the use of a relay.

BEST MODE FOR CARRYING OUT THE INVENTION

Figure 1:
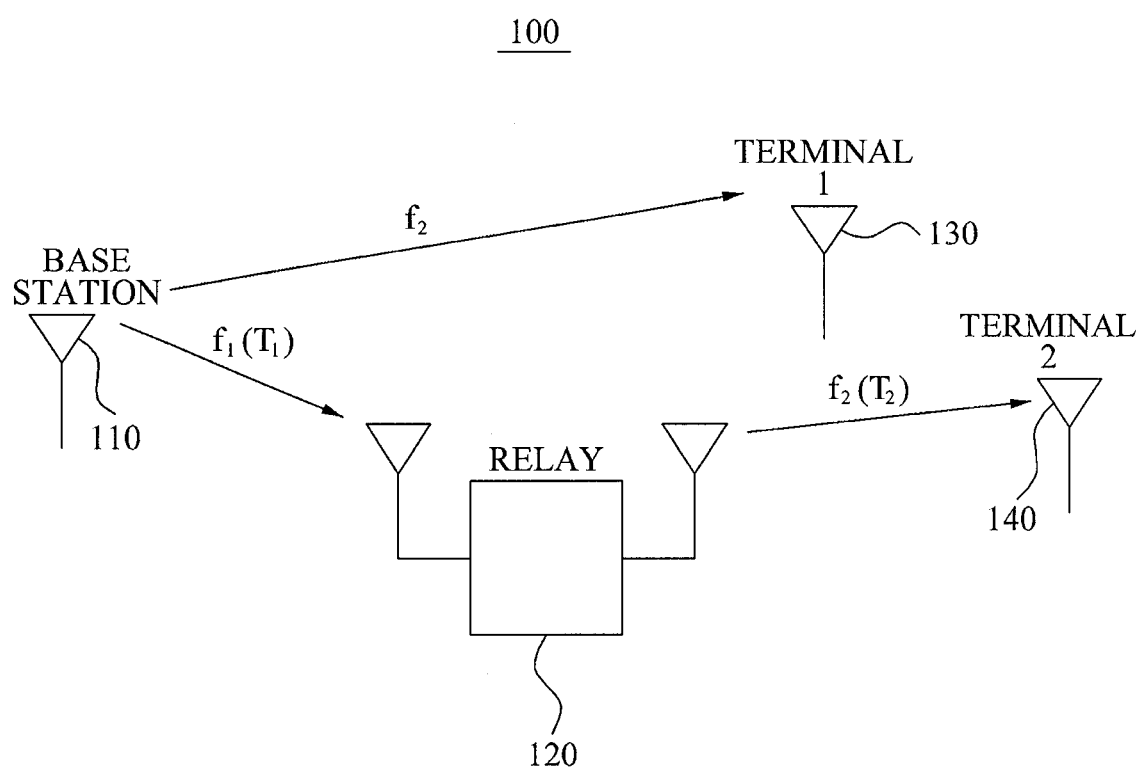
FIG. 1 illustrates a relay system including a relay operated in time division mode.

Reference will now be made in detail to embodiments of the present invention, examples of which are illustrated in the accompanying drawings, wherein like reference numerals refer to the like elements throughout. However, the present invention is not limited by the example embodiments.

FIG. 1 illustrates a relay system 100 including a relay operated in time division mode. Referring to FIG. 1, a relay system 100 includes a base station 110, a relay 120, a terminal 1 130, and a terminal 2 140. A link where data communication between the base station 110 and the relay 120 is performed is referred to as a base station-relay link, and a link where data communication between the relay 120 and the terminal 2 140 is performed is referred to as a relay-terminal 2 link.

The relay system 100 performs data transmission via the base station-relay link and data transmission via the relay-terminal 2 link at different times.

The data transmission via the base station-relay link is performed during a time period $T_1$, and the data transmission via the relay-terminal 2 link is performed during a time period $T_2$.

Since the relay system 100 uses the base station-relay link and the relay-terminal 2 link at different time periods from each other, the base station 110 repeatedly performs reopening of the transmission after periodic discontinuance of the transmission. Accordingly, the relay system 100 has a problem that a periodic discontinuance of the transmission is unavoidable, and thereby transmission delay increases.

The base station 110 transmits data $f_1(T_1)$ during $T_1$ to the relay 120, and the relay 120 transmits data $f_2(T_2)$ during $T_2$ to the terminal 2 140.

The base station 110 transmits data $f_2$ to the terminal 1 130 regardless of the data transmission with respect to the terminal 2.

Figure 2:
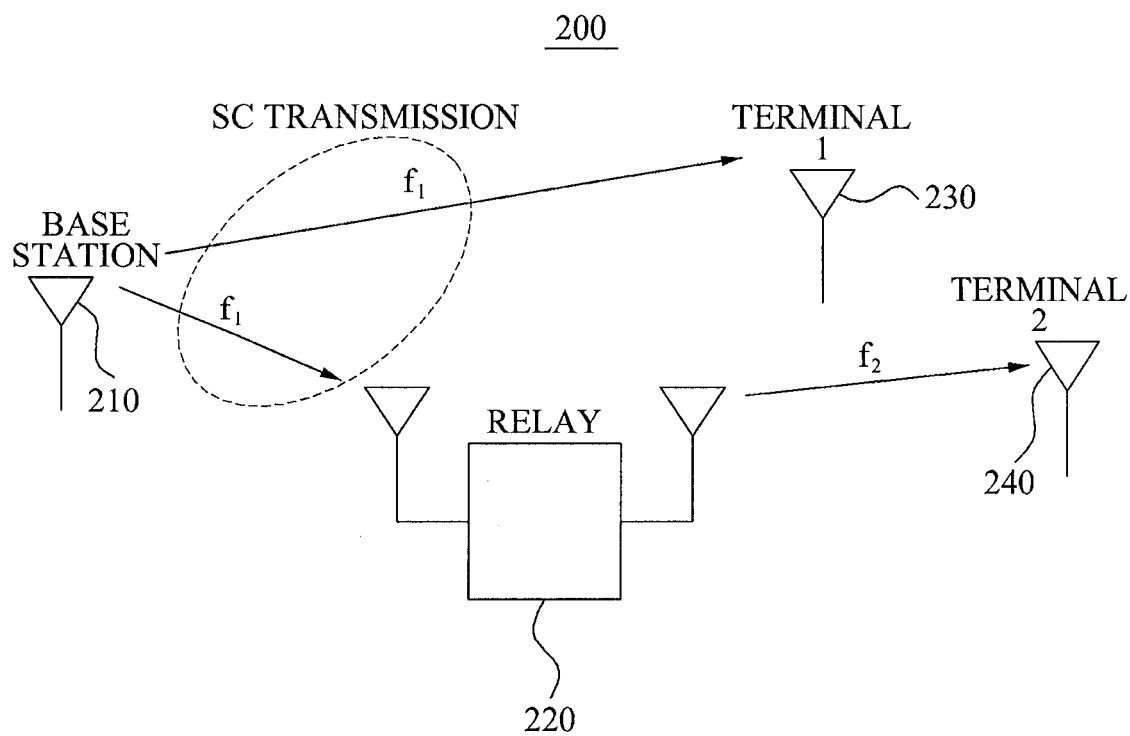
FIG. 2 illustrates a relay system according to an example embodiment of the present invention.

FIG. 2 illustrates a relay system according to an example embodiment of the present invention.

Referring to FIG. 2, the relay system 200 includes a base station 210, a relay 220, a terminal 1 230, and a terminal 2 240.

When performing transmission in a base station-relay link, the base station 210 reuses a resource $f_1$ allocated to the terminal 1 230 of a direct-transmission link to transmit a relay-supported terminal signal, based on superposition coding.

When performing transmission in a relay-terminal link, the relay 220 is allocated with a resource $f_2$ different from the allocated resource in the base station-relay link and transmits the data to the terminal 2 240. Through this configuration, continuous data transmission is possible without time division between the base station-relay link and the relay-terminal link in the relay system 200.

In general, a terminal having a channel with better condition from among terminals that receive superposition coded data may detect data of a terminal having a channel with worse conditions at the same time. In the same manner, a terminal receiving data with a relatively high Signal to Interference plus Noise Ratio (SINR) from among terminals that receive superposition coded data may detect data of a terminal receiving data with a relatively low SINR.

The relay system 200 of the present invention applies the above advantage of the superposition coding to a relay environment. Since a channel characteristic of the base station-relay link that transmits data between the base station 210 and the relay 220 may be maintained to be good, relay transmission may be possible even without separate resource allocation with respect to the base station-relay link. In this instance, the relay 220 may continuously transmit data without time division.

Since the relay 220 continuously transmits data without time division, decreasing of a channel capacity in the relay system 100 operated in the time division mode may be solved. The terminal 2 240, a relay-supported terminal, may experience a certain delay of a transmission time based on a transmission protocol in the relay 220. If this principle is expanded, a multi-hop relay system (not illustrated) may be embodied in an environment of allowing the certain delay of the transmission time without loss of resource efficiency.

Also, since the terminals that receive superposition coded data may detect data of itself and data of other terminals, the relay system may enable information exchange between terminals using the above feature.

The base station 210 may not require a separate resource for transmitting data of the terminal 2 240, a relay-supported terminal, when data transmission is performed via the base station-relay link. This means that the base station 210 reuses a resource allocated to the direct-transmission terminal 1 230, and performs superposition of data to be transmitted to the relay-supported terminal 2 240 to transmit the superposed data, based on the superposition coding.

Data transmission based on the superposition coding in the relay system 200 enables continuous data transmission, thereby substantially increasing frequency efficiency.

Figure 3:
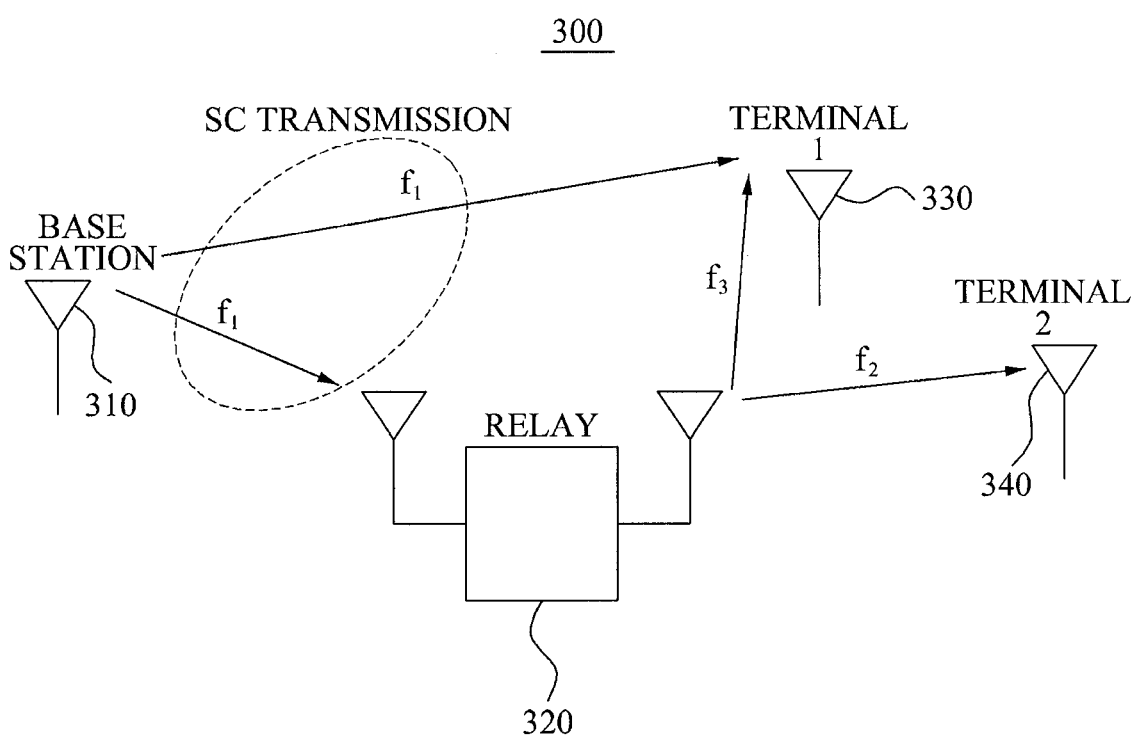
FIGS. 3 to 9 illustrate a relay system according to another example embodiment of the present invention.

FIG. 3 illustrates a relay system 300 according to another example embodiment of the present invention.

Referring to FIG. 3, the relay system 300 includes a base station 310, a relay 320, a terminal 1 330 and a terminal 2 340.

The base station 310 performs superposition of relay-supported data (data to be transmitted to the terminal 2 340) with direct-transmission data (data to be transmitted to the terminal 1 330) and transmits the superposed data to the relay 320 via a base station-relay link, and also transmits the superposed data to the terminal 1 330 via a base station-terminal 1 link.

The base station 310 may perform superposition of the direct-transmission data with the relay-supported data to transmit the superposed data.

The relay 320 restores the relay-supported data and direct-transmission data from the data received from the base station 310.

The relay 320 transmits the restored relay-supported data to the terminal 2 340. In this instance, the relay 320 is allocated with a separate resource $f_2$ for relay-terminal 2 link transmission and transmits the relay-supported data to the terminal 2 340. The process in which the relay 320 transmits the relay-supported data is a relay transmission.

The relay 320 transmits the restored direct-transmission data to the terminal 1 330. In this instance, the relay 320 may be allocated with a separate resource $f_3$ for relay-terminal 1 link transmission and transmit the direct-transmission data to the terminal 1 330.

According to a detailed example embodiment based on FIG. 3, the base station 310 may perform superposition of the direct-transmission data with the relay-supported data and transmit the superposed data. In this instance, the terminal 1 330 may combine the direct-transmission data received from the base station 310 and the direct-transmission data received from the relay 320 to restore the direct-transmission data.

Figure 4:
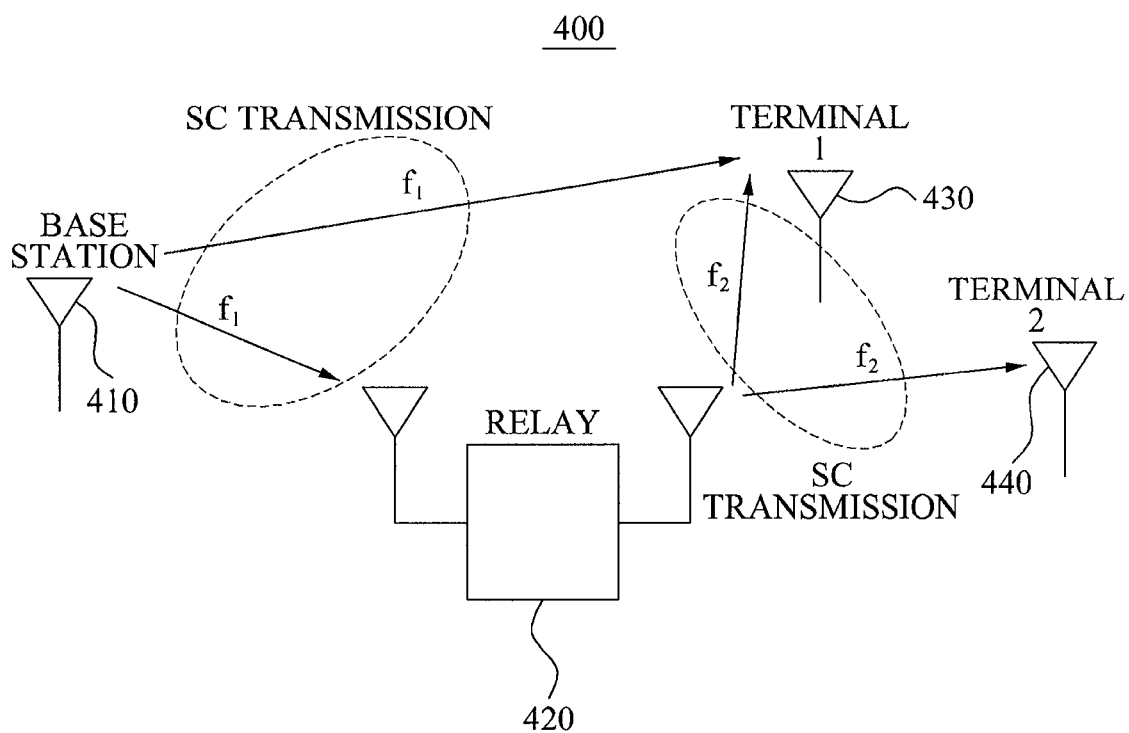

FIG. 4 illustrates a relay system 400 according to another example embodiment of the present invention.

Referring to FIG. 4, the relay system 400 includes a base station 410, a relay 420, a terminal 1 430, and a terminal 2 440.

The base station 410 performs superposition of relay-supported data (data to be transmitted to the terminal 2 440) with direct-transmission data (data to be transmitted to the terminal 1 430) and transmits the superposed data to the relay 420 via a base station-relay link, and also transmits the superposed data to the terminal 1 430 via a base station-terminal 1 link.

The base station 410 may perform superposition of the direct-transmission data with the relay-supported data to transmit the superposed data.

The relay 420 may restore the relay-supported data and the direct-transmission data from the received data from the base station.

The relay 420 performs superposition of the relay-supported data and the direct-transmission data and transmit the superposed data to the terminal 1 430 and the terminal 2 440. The relay 420 may transmit another relay-supported data to another relay-supported terminal (not illustrated). In this instance, the relay 420 may be allocated with a resource $f_3$ different from a resource $f_2$ allocated to superposition coding transmission of the terminal 1 430 and the terminal 2 440, and may use the allocated resource for data transmission of the other relay-supported terminal. When there is more than one other relay-supported terminal, the relay 420 may be allocated with different resources from each other (e.g. $f_3$ and $f_4$) and use the allocated resource for data transmission of each relay-supported terminal.

The relay 420 may perform superposition of the direct-transmission data with the relay-supported data and transmit the superposed data.

In this instance, the terminal 1 430 may combine the direct-transmission data received from the base station 410 and direct-transmission data received from the relay 420 to restore the direct-transmission data.

Figure 5:
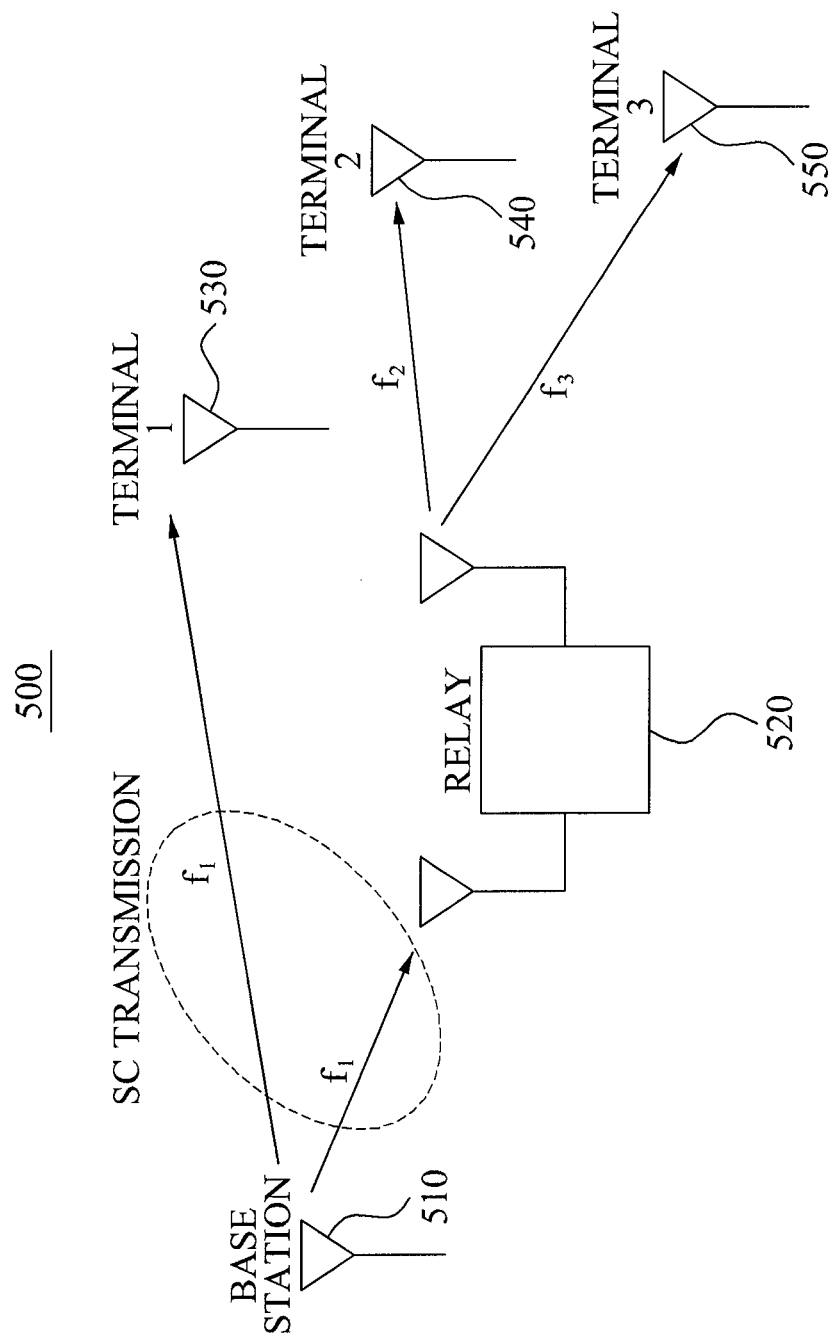

FIG. 5 illustrates a relay system 500 according to another example embodiment of the present invention.

Referring to FIG. 5, the relay system 500 includes a base station 510, a relay 520, a terminal 1 530, a terminal 2 540 and a terminal 3 550.

The base station 510 performs superposition of relay-supported data (data to be transmitted to the terminal 2 540 or the terminal 3 550) with direct-transmission data (data to be transmitted to the terminal 1 530) and transmits the superposed data to the relay 520 via a base station-relay link, and also transmits the superposed data to the terminal 1 530 via a base station-terminal 1 link.

The base station 510 may perform superposition of the direct-transmission data with the relay-supported data to transmit the superposed data.

The relay 520 restores relay-supported data and direct-transmission data from the data received from the base station 510. In this instance, the relay 520 respectively restores data transmitted to the terminal 2 540 and data transmitted to the terminal 3 550, from among the relay-supported data.

The relay 520 is allocated with a separate resource $f_2$ and $f_3$ respectively for the relay-terminal 2 link and the relay-terminal 3 link and transmits data. A process in which the relay 520 transmits the relay-supported data is referred to as relay transmission.

Figure 6:
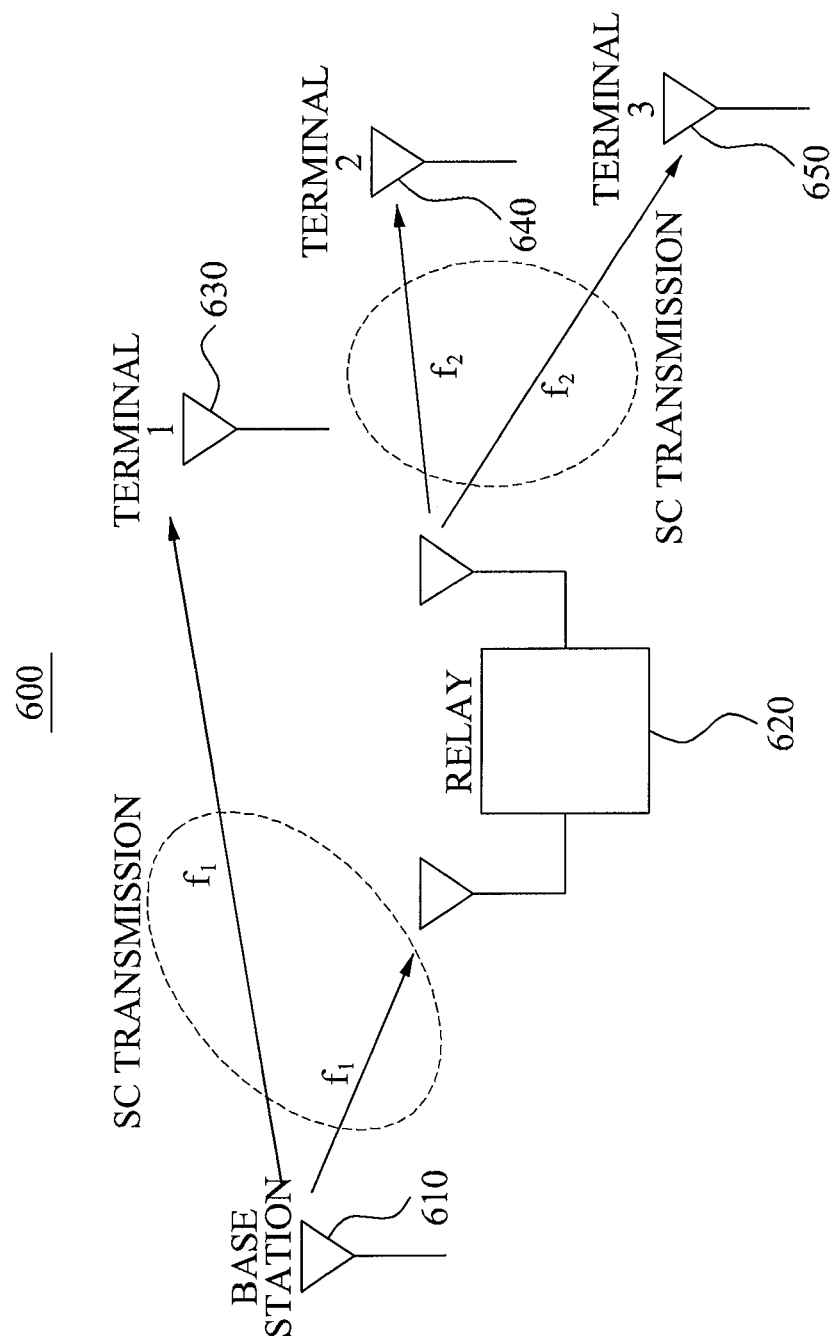

FIG. 6 illustrates a relay system 600 according to another example embodiment of the present invention.

Referring to FIG. 6, the relay system 600 includes a base station 610, a relay 620, a terminal 1 630, a terminal 2 640, and a terminal 3 650.

The base station 610 performs superposition of relay-supported data (data to be transmitted to the terminal 2 640 or the terminal 3 650) with direct-transmission data (data to be transmitted to the terminal 1 630) and transmits the superposed data to the relay 620 via a base station-relay link, and also transmits the superposed data to the terminal 1 630 via a base station-terminal 1 link.

The base station 610 may perform superposition of the relay-supported data with the direct-transmission data to transmit the superposed data.

The relay 620 restores relay-supported data and direct-transmission data from the data received from the base station 610. In this instance, the relay 620 respectively restores data to be transmitted to the terminal 2 640 and data to be transmitted to the terminal 3 650, from among the relay-supported data.

The relay 620 is allocated with a resource ($f_2$) for the relay-terminal 2 link and the relay-terminal 3 link to transmit data. The relay 620 performs superposition of the data to be transmitted to the terminal 2 640 with the data to be transmitted to the terminal 3 650, and transmits the superposed data to the terminal 2 640 and the terminal 3 650. The relay 620 may transmit other relay-supported data to another relay-supported terminal (not illustrated). The relay 620 may be allocated with a new resource $f_3$ and may transmit data to the other relay-supported terminal. If there is more than one other relay-supported terminal, the relay 620 may be allocated with a new resource (e.g. $f_3$ and $f_4$) for each relay-supported terminal to transmit data.

Figure 7:
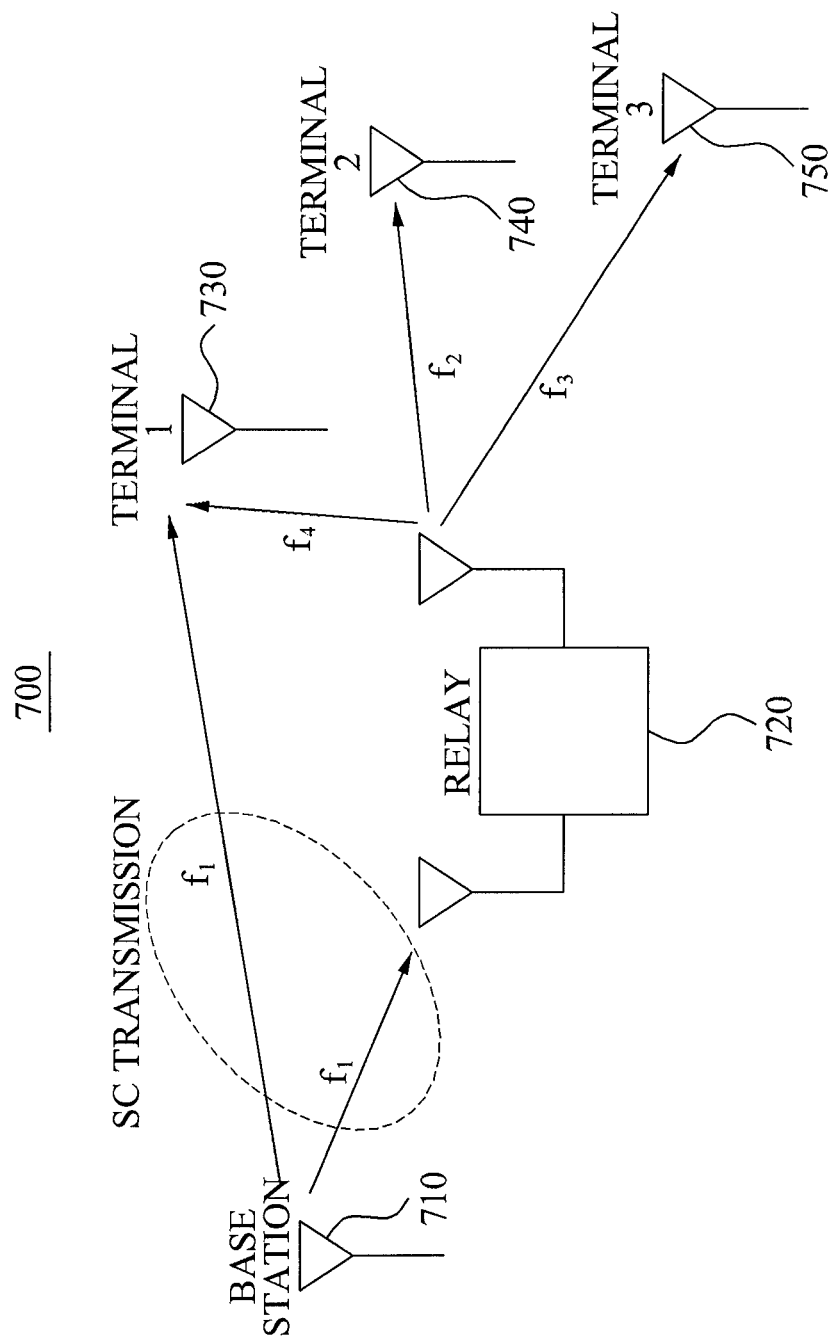

FIG. 7 illustrates a relay system 700 according to another example embodiment of the present invention.

Referring to FIG. 7, the relay system 700 includes a base station 710, a terminal 1 730, a terminal 2 740, and a terminal 3 750.

The base station 710 performs superposition of relay-supported data (data to be transmitted to the terminal 2 740 or the terminal 3 750) with direct-transmission data (data to be transmitted to the terminal 1 730) and transmits the superposed data to the relay 720 via a base station-relay link, and also transmits the superposed data to the terminal 1 730 via a base station-terminal 1 link.

The base station 710 may perform superposition of the relay-supported data and direct-transmission data to transmit the superposed data.

The relay 720 restores the relay-supported data and the direct-transmission data from the data received from the base station 710. In this instance, the relay 720 respectively restores data to be transmitted to the terminal 2 740 and data to be transmitted to the terminal 3 750, from among relay-supported data.

The relay 720 is allocated with a separate resource ($f_2$ and $f_3$) respectively for the relay-terminal 2 link and the relay-terminal 3 link and transmits data. Also, the relay 720 is allocated with a separate resource $f_4$ for the relay-terminal 1 link and transmits the restored direct-transmission data to the terminal 1 730.

In this instance, the terminal 1 730 combines the direct-transmission data received from the base station 710 and direct-transmission data received from the relay 720 to restore the direct-transmission data.

Figure 8:
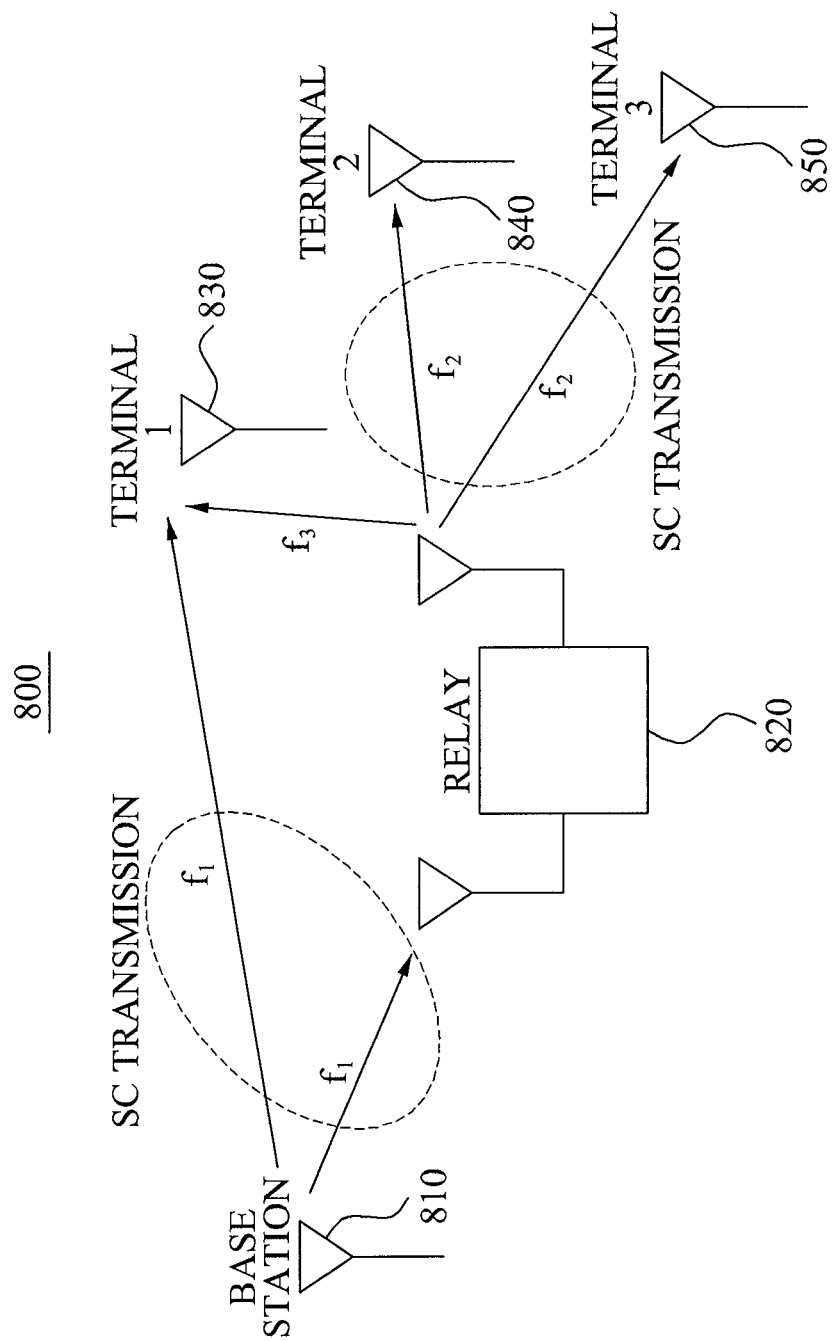

FIG. 8 illustrates a relay system 800 according to another example embodiment of the present invention.

Referring to FIG. 8, a relay system 800 includes a base station 810, a relay 820, a terminal 1 830, a terminal 2 840, and a terminal 3 850.

The base station 810 performs superposition of relay-supported data (data to be transmitted to the terminal 2 840 or the terminal 3 850) with direct-transmission data (data to be transmitted to the terminal 1 830) and transmits the superposed data to the relay 820 via a base station-relay link, and also transmits the superposed data to the terminal 1 830 via a base station-terminal 1 link.

The base station 810 may perform superposition of the relay-supported data with the direct-transmission data to transmit the superposed data.

The relay 820 restores the relay-supported data and the direct-transmission data from data received from the base station 810. In this instance, the relay 820 respectively restores data to be transmitted to the terminal 2 840 and data to be transmitted to the terminal 3 850, from among the relay-supported data.

The relay 820 is allocated with a separate resource $f_2$ for the relay-terminal 2 link and the relay-terminal 3 link to transmit data. The relay 820 performs superposition of the data to be transmitted to the terminal 2 840 with the data to be transmitted to the terminal 3 850, and transmits the superposed data to the terminal 2 840 and to the terminal 3 850.

Also, the relay 820 is allocated with a separate resource $f_3$ for the relay-terminal 1 link and transmit the restored direct-transmission data to the terminal 1 830.

In this instance, the terminal 1 830 combines the direct-transmission data received from the base station 810 and the direct-transmission data received from the relay 820 and restores the direct-transmission data.

Figure 9:
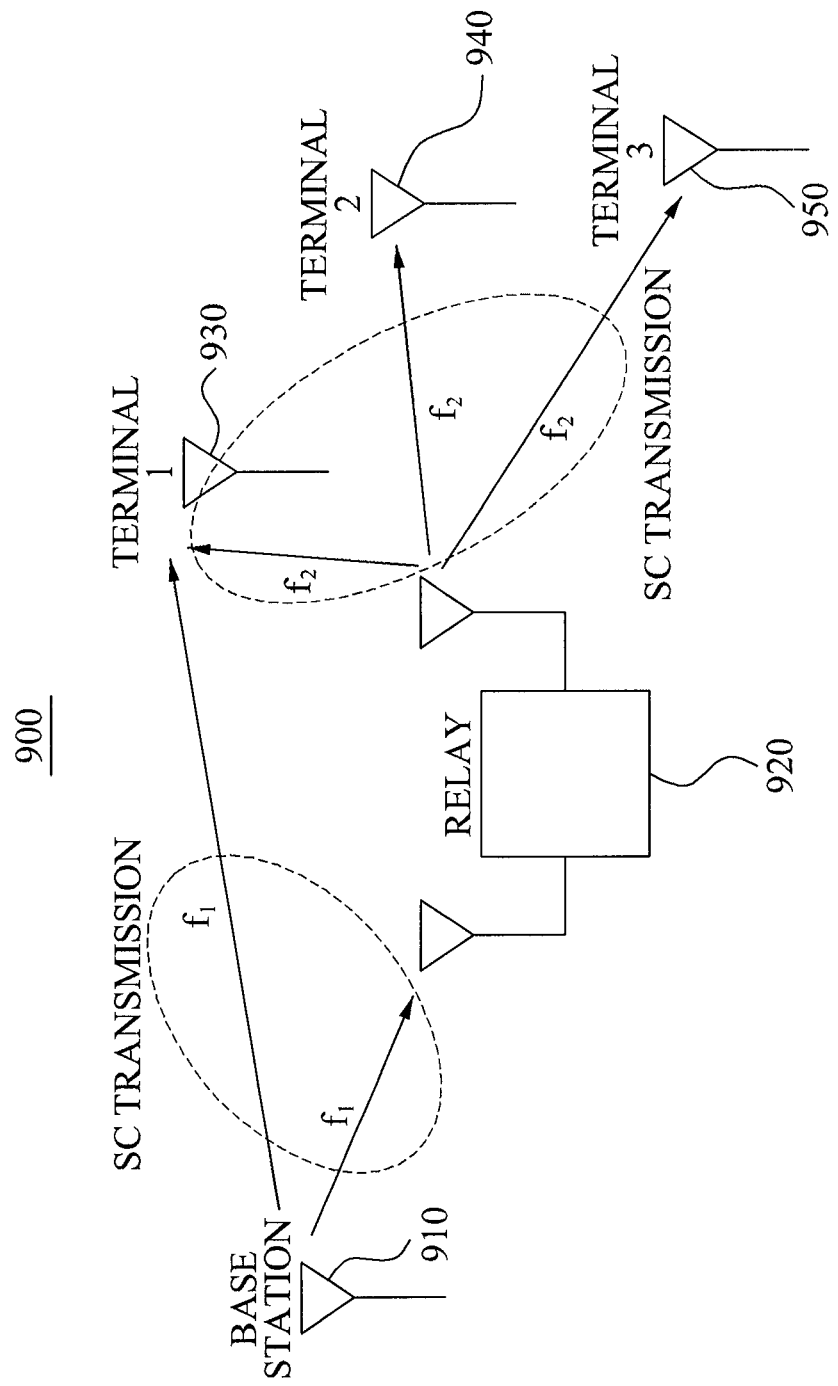

FIG. 9 illustrates a relay system 900 according to another example embodiment of the present invention.

Referring to FIG. 9, the relay system 900 includes a base station 910, a relay 920, a terminal 1 930, a terminal 2 940, and a terminal 3 950.

The base station 910 performs superposition of relay-supported data (data to be transmitted to the terminal 2 940 or the terminal 3 950) with direct-transmission data (data to be transmitted to the terminal 1 930) and transmits the superposed data to the relay 920 via a base station-relay link, and also transmits the superposed data to the terminal 1 930 via a base station-terminal 1 link.

The base station 910 may perform superposition of the relay-supported data and direct-transmission data to transmit the superposed data.

The relay 920 restores the relay-supported data and direct-transmission data from data received from the base station 910. In this instance, the relay 920 respectively restores data to be transmitted to the terminal 2 940 and data to be transmitted to the terminal 3 950, from among the relay-supported data.

The relay 920 is allocated with a separate resource ($f_2$) for the relay-terminal 1 link, the relay-terminal 2 link, and the relay-terminal 3 link, and transmits data. Also, the relay 920 performs superposition of the restored direct-transmission data, the data to be transmitted to the terminal 2 940, and the data to be transmitted to the terminal 3 950, and transmits the superposed data to the terminal 1 930, the terminal 2 940, and the terminal 3 950.

In this instance, the terminal 1 930 combines the direct-transmission data received from the base station 910 and the direct-transmission data received from the relay 920 and restores the direct-transmission data.

In relay-based systems according to example embodiments of the present invention, a relay may detect all detectable signals or detect a portion of the signals. Also, during a process that the relay performs relaying, the relay may relay all detected signals or relay a portion of the detected signals.

Although example embodiments described above describes a downlink communication as a standard, a configuration of the relay-based communication systems according to the example embodiments may be applied to an uplink. Relay-based communication systems according to another example embodiment of the present invention may also continuously transmit data without time division using a superposition coding in the uplink. When performing communication in the uplink, a terminal may transmit data to a base station via a direct-transmission link, and also may transmit data to a relay. The relay may also transmit data to the base station. The base station may combine data received via direct-transmission link and data received from the relay to restore the transmission data. This process is similar to the process that the terminal combines the data received via the direct-transmission link and the data received from the relay to restore the transmission data. The terminal performs uplink transmission of the data to the base station via the direct-transmission link and the relay performs uplink transmission of the data to the base station via base station-relay link, in the same way as the base station performs superposition of data between the direct-transmission link and base station-relay link to perform downlink transmission of data. In this instance, the uplink transmission of the terminal and uplink transmission of the relay may be performed using the same resource.

Also, in a relay-based system according to another example embodiment of the present invention, a terminal may perform as a relay. That is, in a relay-based system including a base station, a terminal 1, a terminal 2, and a terminal 3, the terminal 1 may perform as the above described relay with respect to the terminal 2 and the terminal 3. In this instance, the base station may perform superposition of data to transmit the superposed data to the terminal 1 and the terminal 2 (or the terminal 3) and the terminal 1 may restore data of the terminal 1 and the terminal 2 (or the terminal 3) from received data. The terminal 1 may transmit the restored data to the terminal 2 (or the terminal 3).

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of using a relay in a communication system, the method comprising:
   continuously transmitting a signal based on superposition coding without time division and additional resource allocation, in a base station-relay link and a relay-terminal link, wherein the transmitting in the base station-relay link includes performing superposition coding of a direct-transmission terminal signal and at least one relay-supported terminal signal, and wherein transmitting in the relay-terminal link is allocated with at least one second resource different from a first resource used for the superposition coding transmission of the base station-relay link, to relay-transmit at least one relay-supported terminal signal.

2. The method of claim 1, wherein the relay transmitting of the at least one relay-supported signal performs superposition of at least two relay-supported terminal signals to transmit the superposed signal.

3. The method of claim 1, wherein the transmitting in the relay-terminal link is allocated with at least one second resource different from a first resource used for the superposition coding transmission of the base station-relay link to relay-transmit the direct-transmission terminal signal and the at least one relay-supported terminal signal.

4. The method of claim 3, wherein the transmitting of the direct-transmission terminal signal and at least one relay-supported terminal signal performs superposition of at least two signals from among the direct-transmission terminal signal and the at least one relay-supported terminal signal to transmit the superposed signal.

5. A method of using a relay in a communication system, comprising:
   receiving with the relay a superposition coded signal of a direct-transmission terminal signal and at least one relay-supported terminal signal from a base station;
   continuously relay-transmitting from the relay a signal based on superposition coding without time division in a relay-terminal link, the relay transmitting using at least one second resource different from a first resource used in the transmission of the superposition coded signal of the direct-transmission terminal signal and the at least one relay-supported terminal signal received from the base station.

6. The method of claim 5, wherein the transmitting in the relay-terminal link performs superposition of at least two relay-supported terminal signals to relay-transmit the superposed signal.

7. The method of claim 5, wherein the transmitting in the relay-terminal link performs superposition of at least two signals from among at least one relay-supported terminal signal and a direct-transmission terminal signal to relay-transmit the superposed signal.

8. A relay network structure, comprising:
   a base station;
   a relay;
   a direct-transmission terminal to directly communication with the base station; and
   a relay-supported terminal to transmit a signal to the base station via the relay and receive a signal from the base station via the relay, wherein the relay relays at least one of a relay-supported terminal signal transmitted from the base station to the relay-supported terminal, the relay-supported terminal signal transmitted from the base station and the direct-transmission terminal signal to the relay-supported terminal and to the direct-transmission terminal, a signal transmitted from the relay-supported terminal to the base station, and a signal received from the direct-transmission terminal to the base station, and the relay applies superposition coding in the base station-relay link without additional resource allocation, and is set to continuously transmit the signal without time division and with or without applying superposition coding in the relay-terminal link, wherein during uplink communication the base station combines a signal received from the direct-transmission terminal and a direct-transmission terminal signal received from the relay.

9. The relay network structure of claim 8, wherein the relay detects the direct-transmission terminal signal and at least one relay-supported terminal signal, and relay-transmits at least one relay support terminal signal from among the detected signals.

10. The relay network structure of claim 9, wherein the relay performs superposition of at least two relay-supported terminal signals from among the detected at least one relay-supported terminal signal and transmits the at least two relay-supported terminal signals.

11. The relay network structure of claim 8, wherein the relay detects the direct-transmission terminal signal and the at least one relay-supported terminal signal, and relay-transmits the direct-transmission terminal signal and at least one relay-supported terminal signal from the detected signals.

12. The relay network structure of claim 11, wherein the relay performs superposition of at least two signals from among the detected direct-transmission terminal signal and the at least one relay-supported terminal signal to relay-transmit the superposed signal.

13. The relay network structure of claim 8, wherein during downlink communication the direct-transmission terminal combines a direct-transmission terminal signal received from the base station and a direct-transmission terminal signal received from the relay.

14. A base station, comprising:
a transmitter; and
a resource management unit to allocate a resource to a base station-terminal link based on superposition coding transmission, and to allocate the resource to a relay-terminal link based on the superposition coding transmission, wherein the base station continuously transmits a signal based on superposition coding without time division and additional resource allocation in the base station-relay link and the relay-terminal link, the resource management unit managing a superposition coding transmission of a direct-transmission terminal signal and at least one relay-supported terminal signal in the base station-relay link, and continuously transmitting the signal based on superposition coding without time division and additional resource allocation in the base station-relay link and the relay-terminal link, the resource management unit further managing a portion of or an entire relay transmission of the direct-transmission terminal signal and at least one relay-supported user terminal signal in the relay-terminal link, the relay transmission including the portion of or the entire superposition coding transmission of the direct-transmission terminal signal and the at least one relay-supported terminal signal, and continuously transmits the signal based on superposition coding without time division and additional resource allocation in the base station-relay link and the relay-terminal link.

* * * * *

UNITED STATES PATENT AND TRADEMARK OFFICE
CERTIFICATE OF CORRECTION

PATENT NO. : 8,509,681 B2
APPLICATION NO. : 12/747655
DATED : August 13, 2013
INVENTOR(S) : Tae Gyun Noh et al.

It is certified that error appears in the above-identified patent and that said Letters Patent is hereby corrected as shown below:

On the Title page, column 1, item (73) Assignee listed as:

"Electronics and Telecommunication Research Institute"

should be listed as

-- Electronics and Telecommunications Research Institute --

Signed and Sealed this
Eighth Day of October, 2013

Teresa Stanek Rea
*Deputy Director of the United States Patent and Trademark Office*